US008774071B2

(12) United States Patent
Meng

(10) Patent No.: US 8,774,071 B2
(45) Date of Patent: Jul. 8, 2014

(54) METHOD AND SYSTEM FOR INTERCOMMUNICATION BETWEEN MOBILE TERMINAL AND WIMAX BASE STATION, AND MOBILE TERMINAL

(75) Inventor: Xiangyu Meng, Guangdong (CN)

(73) Assignee: ZTE Corporation, Shenzhen (CN)

( * ) Notice: Subject to any disclaimer, the term of this patent is extended or adjusted under 35 U.S.C. 154(b) by 341 days.

(21) Appl. No.: 13/060,648

(22) PCT Filed: Dec. 26, 2008

(86) PCT No.: PCT/CN2008/073790
§ 371 (c)(1),
(2), (4) Date: Feb. 24, 2011

(87) PCT Pub. No.: WO2010/022575
PCT Pub. Date: Mar. 4, 2010

(65) Prior Publication Data
US 2011/0158217 A1    Jun. 30, 2011

(30) Foreign Application Priority Data

Aug. 25, 2008   (CN) .......................... 2008 1 0210533

(51) Int. Cl.
*H04B 7/00* (2006.01)
(52) U.S. Cl.
USPC ............................ 370/310; 370/328; 455/574
(58) Field of Classification Search
USPC .................. 370/310, 328–339, 210; 455/574
See application file for complete search history.

(56) References Cited

U.S. PATENT DOCUMENTS

| 2007/0038764 | A1 | 2/2007 | Maillard et al. |
| 2007/0115899 | A1 | 5/2007 | Ovadia et al. |
| 2007/0173283 | A1* | 7/2007 | Livet et al. ................. 455/552.1 |
| 2007/0238448 | A1* | 10/2007 | Gallagher et al. ......... 455/414.2 |
| 2007/0253339 | A1 | 11/2007 | Ovadia et al. |
| 2008/0113692 | A1* | 5/2008 | Zhao et al. .................... 455/574 |
| 2009/0016246 | A1* | 1/2009 | Battin et al. ................. 370/310 |
| 2011/0242964 | A1* | 10/2011 | Porat et al. .................... 370/210 |

FOREIGN PATENT DOCUMENTS

| CN | 1859442 A | 11/2006 |
| CN | 1964276 A | 5/2007 |
| CN | 101123577 A | 2/2008 |
| WO | 2007078663 A2 | 7/2007 |

OTHER PUBLICATIONS

European Patent Office; "Supplementary European Search Report" For Application No. EP 08 87 6818; Nov. 20, 2012.

* cited by examiner

*Primary Examiner* — Ricky Ngo
*Assistant Examiner* — Iqbal Zaidi
(74) *Attorney, Agent, or Firm* — Christopher L. Parmelee; Walker & Jocke

(57) ABSTRACT

A method for intercommunication between a mobile terminal and a WiMAX base station comprises: connecting the mobile terminal with a WiMAX wireless data card via an interface (S102); obtaining configuration information of the WiMAX wireless data card, and fulfilling the logic connection between the mobile terminal and the WiMAX wireless data card according to the configuration information (S104); and using the WiMAX wireless data card to fulfill the intercommunication with the WiMAX base station (S106). A system and a mobile terminal are used to implement the method.

7 Claims, 5 Drawing Sheets

METHOD AND SYSTEM FOR INTERCOMMUNICATION BETWEEN MOBILE TERMINAL AND WIMAX BASE STATION, AND MOBILE TERMINAL

FIELD OF THE INVENTION

The present invention relates to the communication field, in particular to a method, a system and a mobile terminal for intercommunication between a mobile terminal and a world interoperability for microwave access (WiMAX) base station.

BACKGROUND OF THE INVENTION

WiMAX is a wideband wireless metropolitan area network (WMAN) technology based on the 802.16 series standards of Institute for Electrical and Electronic Engineers (IEEE).

At present, the dual mode mobile phone of global system for mobile communications (GSM)/wireless fidelity (WiFi) based on IEEE 802.1b standard can realize seamless handover between the GSM network and wireless local area network (WLAN), and support unlicensed mobile access (UMA) technology. Users can make up the defect that the indoor signal of mobile terminal such as mobile phone is weak. When network of the mobile phone is busy or the signal is bad, the mobile phone user can perform voice communication through the WiFi network. In practical application, the handover between the two networks is realized through the voice over IP (VoIP) technology, and the expense using this technology is comparatively low and the technology can provide convenience for the mobile phone and wide frequency wireless phone. In addition, the use of the VoIP technology can also realize the functions of browsing web page, sending and receiving e-mail, short messages and multimedia messages and so on. As long as the mobile phone is moved to the areas covered by the wireless wideband, the user can make a free call worldwide by a network phone mode.

In the present network, there are some areas still not covered by the GSM/WiFi networks, or some with bad signals of the GSM/WiFi networks. Aiming at the above-mentioned situations, the mobile phone terminal can realize the communication through the WiMAX network. Therefore, how to realize the intercommunication between the GSM/WiFi dual mode mobile phone and the WiMAX base station is a problem needed to be solved at present.

SUMMARY OF THE PRESENT INVENTION

The present invention is put forward aiming at the intercommunication problem between a GSM/WiFi dual mode mobile phone and a WiMAX base station at present. For this reason, the present invention aims to provide an improved intercommunication scheme between a mobile terminal and the WiMAX base station to solve at least one of above-mentioned problems.

In order to achieve the above-mentioned aim, a method for intercommunication between a mobile terminal and a WiMAX base station is provided according to one aspect of the present invention.

In the method for intercommunication between the mobile terminal and the WiMAX base station according to the present invention, the mobile terminal is a dual mode terminal which supports two network systems except the WiMAX. The method comprises: connecting the mobile terminal with a WiMAX wireless data card via an interface; obtaining configuration information of the WiMAX wireless data card, and fulfilling the logic connection between the mobile terminal and the WiMAX wireless data card according to the configuration information; and using the WiMAX wireless data card to fulfill the intercommunication with the WiMAX base station.

Preferably, that using the WiMAX wireless data card to fulfill the intercommunication with the WiMAX base station comprises: the mobile terminal registering with the WiMAX base station through the WiMAX wireless data card; and the mobile terminal entering the mode of intercommunication with the WiMAX base station.

Preferably, the step of the mobile terminal registering with the WiMAX base station through the WiMAX wireless data card comprises: the mobile terminal realizing at least one of the following operations through an encapsulated application program interface: network searching, network access, and network authentication; and the mobile terminal sending to the WiMAX base station an access request for registration.

Preferably, the interface is a universal serial bus interface, and the WiMAX wireless data card is a WiMAX universal serial bus wireless data card.

In order to achieve the above-mentioned aim, a mobile terminal is provided according to another aspect of the present invention.

The mobile terminal according to the present invention comprises: an interface module, configured to connect a WiMAX wireless data card with the mobile terminal; a connection managing module, configured to select the mobile terminal to be connected with a WiMAX base station; and a device managing module, configured to obtain and/or configure configuration information of the WiMAX wireless data card, and intercommunicate with the WiMAX base station through the WiMAX wireless data card.

Preferably, the mobile terminal further comprises: a power supply module, configured to supply power for the WiMAX wireless data card.

Preferably, the interface module is a universal serial bus interface, and the WiMAX wireless data card is a WiMAX universal serial bus wireless data card.

Preferably, the connection managing module is configured to execute at least one of the following operations through invoking encapsulated application program interface: network searching, network access, network disconnection, network authentication, frequency range configuration, connection mode selection, setting of search net step length, setting of authentication options, and setting of handover options.

Preferably, the device managing module is configured to realize at least one of the following operations through invoking encapsulated application program interface: mobile alliance opening, firmware updating management, and configuration and acquisition of device parameters.

In order to achieve the above-mentioned aim, an intercommunication system is further provided according to another aspect of the present invention.

The intercommunication system according to the present invention, which is configured to realize the intercommunication between a mobile terminal and a WiMAX base station, comprises the mobile terminal which is mentioned above. Furthermore, the intercommunication system further comprises: the WiMAX wireless data card, connected with the mobile terminal through the interface module of the mobile terminal; and the WiMAX base station, configured to realize the intercommunication with the mobile terminal through the WiMAX wireless data card.

In virtue of the technical scheme of the present invention, on the basis of small improvement to the software and/or hardware of existing mobile phone terminal (namely, mobile terminal), the present invention realizes the intercommunication between the mobile phone terminal and the WiMAX base station through the WiMAX Universal Serial Bus (USB) wireless data card, solves the problem that the GSM/WiFi dual mode mobile phone can not intercommunicate with the WiMAX base station, improves the compatibility of the mobile phone, and enable user can experience the wideband data service brought by WiMAX technology.

BRIEF DESCRIPTION OF THE DRAWINGS

The drawings in the specification provide a further understanding to the present invention and constitute a part of the application. The exemplary embodiments of the present invention and the explanation thereof are given thereafter by way of illustration only, and thus are not limitative of the present invention, and wherein.

DETAILED DESCRIPTION

General Description of Functions

In the present invention, the GSM, WiFi, WiMAX multimode terminal, voice service and data service are integrated, a group of voice call continuity (VCC) service components on the basis of IP multimedia subsystem (IMS)/Fixed-Mobile Convergence (FMC) are developed on high and middle grade intelligent mobile phones, and a uniform modularization platform is provided on multimode mobile phone terminals of various platforms and different systems, which can be beared on various wireless communication protocol stacks such as GSM/General Packet Radio Service (GPRS), Time Division-Synchronous Code Division Multiple Access (TD-SCDMA), Wideband Code Division Multiple Access (WCDMA) and so on, and can also be beared on wideband wireless access modules such as the WiFi, WiMAX and so on, which can meet the development requirement of the FMC.

In the technical solution of the present invention, the mobile terminal is connected with the WiMAX wireless data card via an interface; configuration information of the WiMAX wireless data card is obtained, and the logic connection between the mobile terminal and the WiMAX wireless data card is fulfilled according to the configuration information; and the WiMAX wireless data card is used to fulfill the intercommunication with the WiMAX base station.

The preferable embodiments of the present invention will be detailed hereinafter in connection with the drawings. What should be understood is that the preferable embodiments detailed hereafter are only given by way of illustration and explanation, and thus are not limitative of the present invention.

In the description hereafter, for the purpose of explanation, a plurality of specific details are given to provide thorough comprehension to the present invention. Nevertheless, obviously, the present invention can also be realized without the specific details. In addition, without departing from the spirit and scope defined by the claims appended, the embodiments of the present invention hereafter can be inter-combined with the details in the embodiments.

Method Embodiment

Figure 1:
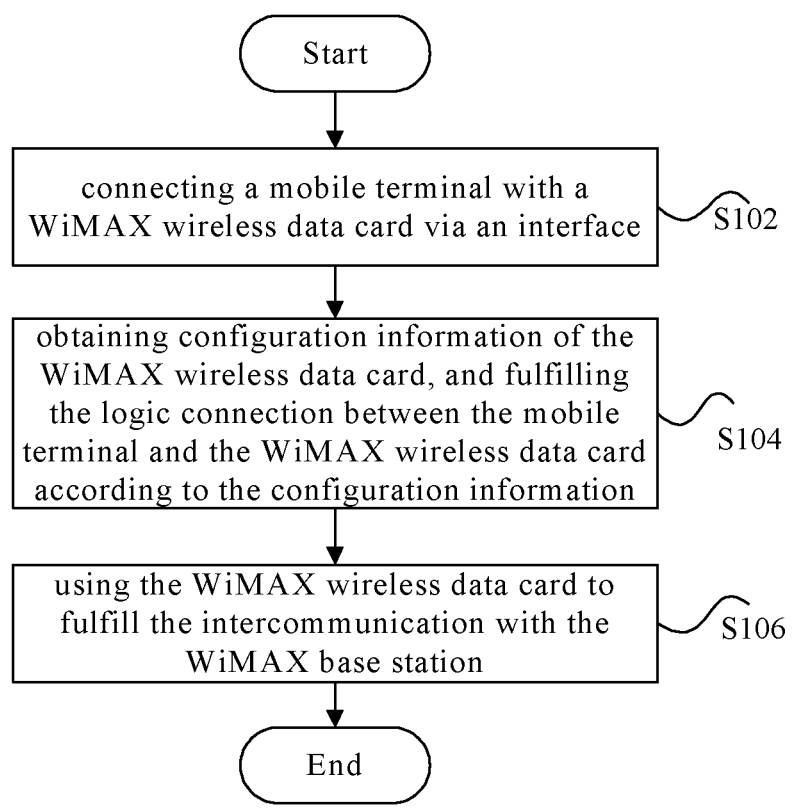
FIG. 1 is a flowchart of a method for intercommunication between a mobile terminal and a WiMAX base station according to the embodiment of the present invention.

A method for intercommunication between a mobile terminal and WiMAX base station is provided according to the embodiment of the present invention. As mentioned above, in the present embodiment, the mobile terminal is a dual mode terminal which supports two network systems except the WiMAX, e.g. GSM/WiFi dual mode mobile phone. FIG. 1 is a flowchart of the method for intercommunication between a mobile terminal and WiMAX base station according to the embodiment of the present invention. As shown in FIG. 1, the method comprises the steps as follows (step S102-step S106):

Step S102, connecting the mobile terminal with a WiMAX wireless data card via an interface; wherein preferably, in the present embodiment of the present invention, the interface used is an USB interface, and the WiMAX wireless data card is a WiMAX USB wireless data card; and, the mobile terminal provides an independent power supply to the WiMAX wireless data card;

Step S104, obtaining configuration information of the WiMAX wireless data card, and fulfilling the logic connection between the mobile terminal and the WiMAX wireless data card according to the configuration information; and Step S106, using the WiMAX wireless data card to fulfill the intercommunication with the WiMAX base station; wherein concretely, the mobile terminal registers with the WiMAX base station through the WiMAX wireless data card, and the mobile terminal enters the mode of intercommunication with the WiMAX base station after the registration.

In the registering operation in step S106, the mobile terminal realizes at least one of the following operations through an encapsulated API: network searching, network access, and network authentication; and the mobile terminal sends to the WiMAX base station an access request for registration.

In virtue of the embodiment, the wideband data service and the intercommunication of voice and data between the GSM/WiFi dual mode mobile phone and the WiMAX base station can be realized; and voice calling, the automatic handover, manual handover, and seamless handover among the modes such as WiFi/GSM/WiMAX and so on can be guaranteed.

Figure 2:
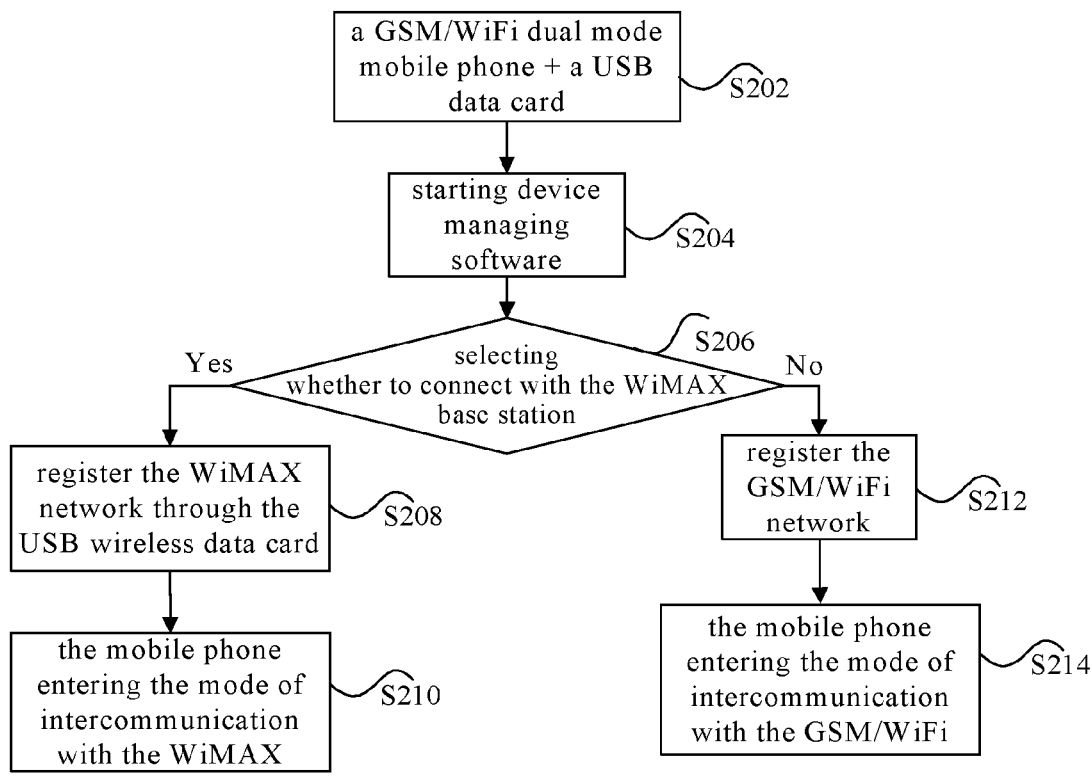
FIG. 2 is a flowchart of implementation of the software system of the GSM/WiFi dual mode mobile phone which supports the intercommunication with the WiMAX base station according to the embodiment of the present invention.

The above-mentioned technical solution will be detailed hereafter by taking the GSM/WiFi dual mode mobile phone as an example. FIG. 2 is a flowchart of implementation of the software system of the GSM/WiFi dual mode mobile phone which supports the intercommunication with the WiMAX base station according to the embodiment of the present invention. As shown in FIG. 2, the method comprises the steps as follows:

Step S202, connecting GSM/WiFi dual mode mobile phone with the WiMAX USB wireless data card (corresponding to the step S102 in FIG. 1);

Step S204, starting the device managing (DM) software, which is configured to control the information intercommunication between the WiMAX USB wireless data card and the OMA Server (namely, WiMAX base station) through sending instructions, and fulfilling the functions concerned by operators or users; wherein preferably, the DM mainly realizes OMA DM1.2, FUMO1.0 functions, and configuration and acquisition function of the device parameters (e.g. bootstrapping, provisioning, etc) (corresponding to the step S104 in FIG. 1);

Step S206, selecting whether to connect with the WiMAX base station through the Connection Management (CM) software, wherein the CM realizes the functions of network searching, network access, network disconnection, network authentication and so on through invoking an encapsulated API, and can also realize the specific functions of frequency range configuration, connection mode selection (automatic mode or manual mode), setting of search net step length, setting of authentication options, and setting of handover options, and wherein if the selection result is yes, it executes step S208; and if the selection result is no, it executes step S212;

Step S208, if selecting to connect with the WiMAX base station, then using the USB wireless data card to register the WiMAX network, and executing step S210;

Step S210, the mobile phone entering the intercommunication mode with the WiMAX base station (corresponding to the step S106 in FIG. 1);

Step S212, if selecting to connect with the GSM or WiFi network, then registering the GSM or WiFi network, and executing step S214;

Step S214, the mobile phone entering the mode of intercommunication with the GSM or WiFi network.

In virtue of the embodiment, in the remote area covered by the WiMAX base station, if the mobile phone can not search the GSM and WiFi network, the GSM/WiFi dual mode mobile phone according to the embodiment of the present invention can perform the data and voice services through the way of starting the WiMAX USB wireless data card to connect with the WiMAX base station, with the result of improving the ability of network coverage effectively.

Device Embodiment

Figure 3:
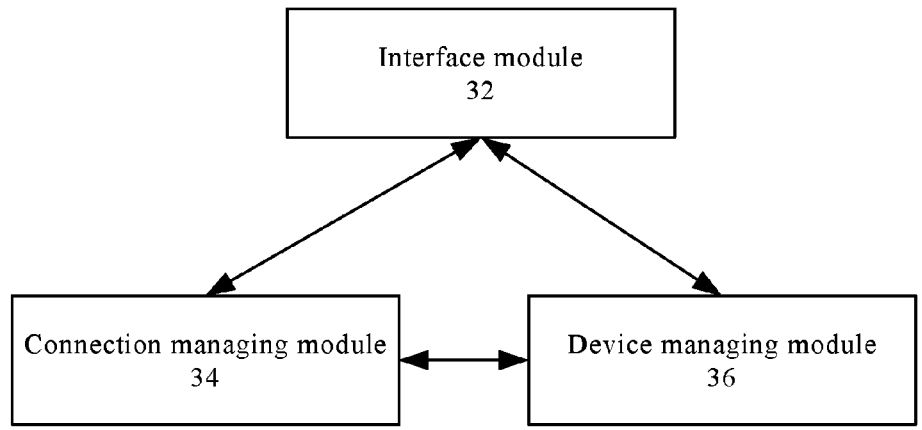
FIG. 3 is a structure diagram of a mobile terminal according to the embodiment of the present invention.

A mobile terminal is provided according to the embodiment of the present invention. FIG. 3 is a structure diagram of the mobile terminal according to the embodiment of present invention. As shown in FIG. 3, the device comprises: an interface module 32, a connection managing module 34, and a device managing module 36. Each module will be detailed hereafter.

Concretely, the interface module 32 is configured to connect a WiMAX wireless data card with the mobile terminal; wherein the interface module is a USB interface, and the WiMAX wireless data card is a WiMAX USB wireless data card. The connection managing module 34, connected with the interface module 32, is configured to select the mobile terminal to be connected with the WiMAX base station, and is further configured to execute at least one of the following operations through invoking an encapsulated application program interface: network searching, network access, network disconnection, network authentication, frequency range configuration, connection mode selection, setting of search net step length, setting of authentication options, and setting of handover options. The device managing module 36, connected with the interface module 32 and the connection managing module 34, is configured to obtain and/or configure configuration information of the WiMAX wireless data card, and intercommunicate with the WiMAX base station through the WiMAX wireless data card. Concretely, the device managing module realizes at least one of the following operations through invoking the encapsulated application program interface: Open Mobile Alliance DM1.2, updating management of firmware, and configuration and acquisition of device parameters.

Preferably, the above-mentioned device can further comprise a power supply module (which is not shown in FIG. 3). The power supply module can be configured to supply power for the WiMAX wireless data card.

In virtue of the embodiment, a mobile terminal which can intercommunicate with the WiMAX base station is provided to enable the user experience the wideband data service brought by WiMAX technology.

Figure 4:
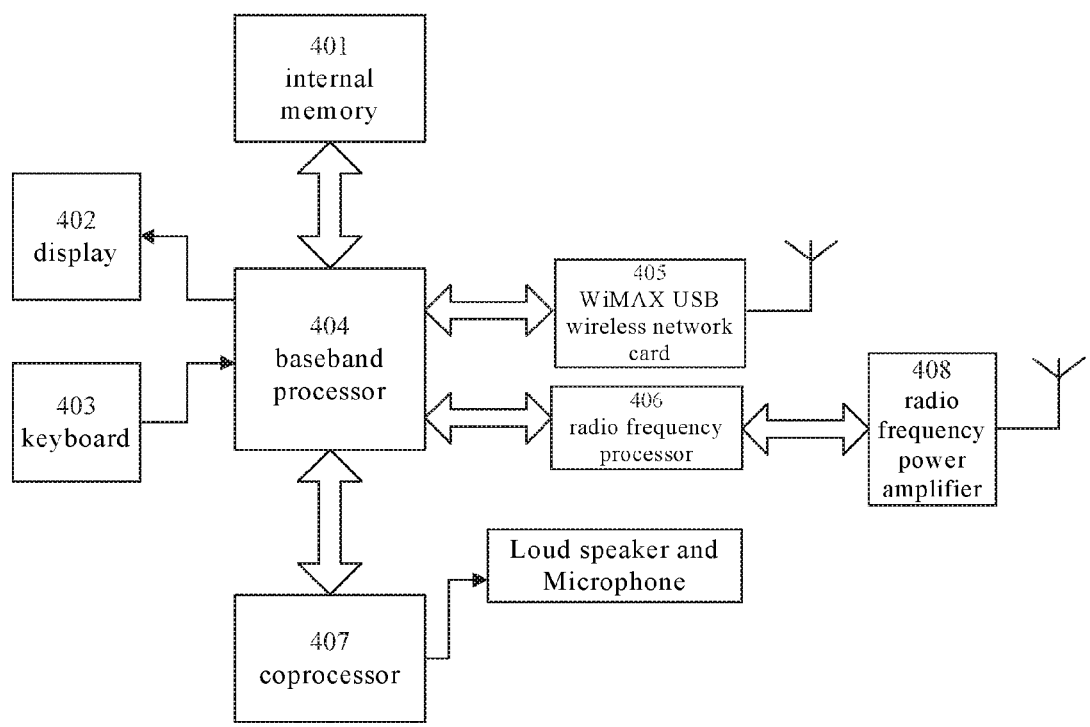
FIG. 4 is a schematic diagram of the hardware system structure of the GSM/WiFi dual mode mobile phone which supports the intercommunication with the WiMAX base station according to the embodiment of the present invention.

The present invention will be detailed hereinafter with reference to the drawings and in connection with the embodiment of the intercommunication between the GSM/WiFi dual mode mobile phone (namely, mobile terminal) and the WiMAX base station. FIG. 4 is a schematic diagram of the hardware system structure of the GSM/WiFi dual mode mobile phone which supports the intercommunication with the WiMAX base station according to the embodiment of the present invention. As shown in FIG. 4, the hardware system structure comprises: a baseband processor 404, radio frequency part (including a Radio Frequency (RF) processor 406 and a radio frequency Power Amplifier (PA) 408), an internal memory 401, a display 402, a keyboard 403, a coprocessor 407 (including a loud speaker and a microphone) and so on. Additionally, the GSM/WiFi dual mode mobile phone further comprises other parts, such as a power supply module, a chord chip, a digital camera chip, an Mp3 chip, and an MPEG chip and so on (which are not shown in FIG. 4); wherein only one set of voice input device and voice output device is set in the mobile phone.

The GSM/WiFi dual mode mobile phone is connected with the WiMAX USB wireless data card 405 through various interfaces which include, but are not limited to: USB, RS-232, Cardbus, Ethernet, and SDIO. As a data access device, the WiMAX USB wireless data card 405 preferably uses the serial data bus, which meets the USB2.0 criterion, to transmit data and realize the intercommunication between the WiMAX USB wireless data card and the GSM/WiFi dual mode mobile phone. The WiMAX USB wireless data card is provided with an independent power supply module, i.e., the mobile terminal, to supply power for the WiMAX wireless data card.

In the above, the WiMAX USB wireless data card can realize the functions defined in the IEEE802.16 2005 protocol, specific interface (e.g. USB) drive function, chip enable bootstrap function (chip bootstrap is realized by the Bootloader program solidified on the chip of the WiMAX USB wireless data card, is configured to initialize the hardware of the WiMAX USB wireless data card, and establish the mapping of the internal memory space), and firmware download function and so on. The WiMAX USB wireless data card is in the form of firmware, and is downloaded from the mobile phone when the device is power on and started. In the terminal system, the data card is used as a data access device, the data card is provided with a physical interface which is connected with the mobile phone via the USB interface, and adopts the serial data bus, which meets the USB 2.0 criterion, to transmit data.

Through adding a USB interface of the GSM/WiFi dual mode mobile phone, the embodiment improves the hardware design of the GSM/WiFi dual mode mobile phone, and provides hardware condition for the intercommunication between the GSM/WiFi dual mode mobile phone and the WiMAX base station.

Figure 5:
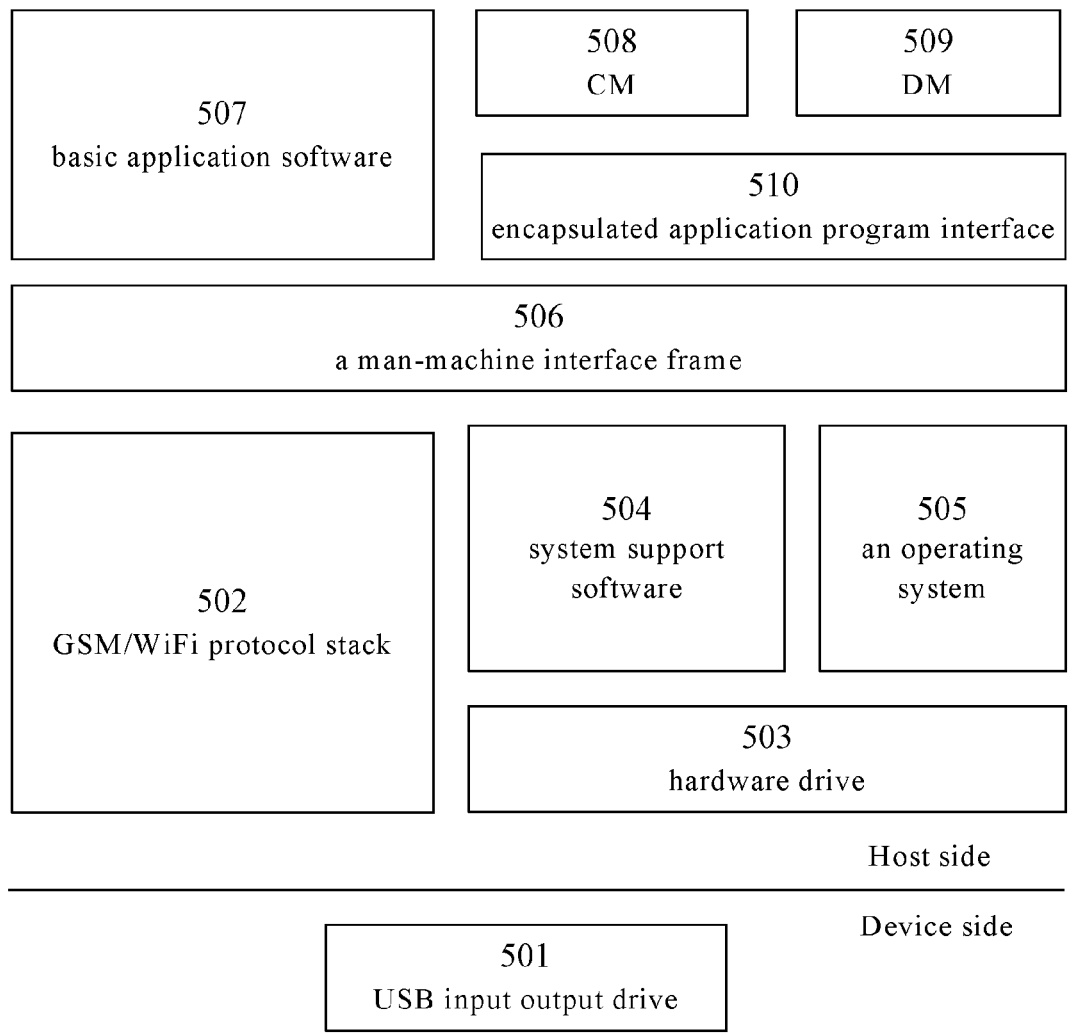
FIG. 5 is a schematic diagram of the software system architecture of the GSM/WiFi dual mode mobile phone which supports the intercommunication with the WiMAX base station according to the embodiment of the present invention.

The hardware system structure of the GSM/WiFi dual mode mobile phone which supports the intercommunication with the WiMAX base station is detailed above. Hereafter, on the basis of the dual mode mobile phone as shown in FIG. 4, the software system architecture of the GSM/WiFi dual mode mobile phone which supports the intercommunication with the WiMAX base station is detailed. FIG. 5 is a schematic diagram of the software system architecture of the GSM/WiFi dual mode mobile phone which supports the intercommunication with the WiMAX base station according to the embodiment of the present invention. As shown in FIG. 5, the software architecture part mainly comprises a device (WiMAX USB wireless data card) side and a host (GSM/WiFi dual mode mobile phone) side. The structure of the software system architecture will be detailed hereafter. The software system architecture comprises: a USB input output (IO) drive 501, a GSM/WiFi protocol stack 502, a hardware drive 503, a system support software 504, an operating system 505, a Man-Machine Interface (MMI) frame 506, a basic application software 507, a Connection Management (CM) 508, a Device Management (DM) 509, and an encapsulated application program interface (API) 510.

Concretely, the USB IO drive 501 belongs to the device side module, is configured to realize the functions defined in the IEEE802.16 3005 protocol, specific interface (e.g. USB) drive function, and chip enable bootstrap function and so on and in form of firmware, and is stored in the storage media of Flash/EEPROM and etc. of the device.

As described hereafter, the term "storage media" means one or multiple kinds of devices for storing data, which include Read Only Memory (ROM), Random Access Memory (RAM), magnetic RAM, magnetic core memory, magnetic disc storage media, optical storage media, flash memory device and/or the other machine readable media for storing information. The term "machine readable media" includes but is not limited to: portable or fixed storing device, optical storing device, wireless channel, or the other media which can store, hold or load instructions and/or data.

In the GSM/WiFi dual mode mobile phone, the GSM/WiFi protocol stack 502 is configured to realize the GSM/WiFi protocol. The hardware drive 503 is configured to realize the hardware drive of the mobile phone and the drive of the WiMAX USB wireless data card. Furthermore, in the present embodiment, the system support software 504 and the operating system 505 can adopt the operating system of Windows Mobile. The MMI frame 506 is realized by using the window mechanism of Windows Mobile. The basic application software 507 comprises the original call software, short message software, web page browsing software and the other application software of the GSM/WiFi dual mode mobile phone. The CM 508 and the DM 509 belong to the software application layer, and are configured to realize the setting of connection and instruction transmission between the WiMAX connection device and the WiMAX base station. The encapsulated API 510 is configured to provide interfaces for the CM and DM of the upper layer (software application layer), take the responsibility for the realization of the CM and DM functions, and communicate with the drive of the host through invoking the kernel function of the operating system 505. The host drive forwards the message to the WiMAX USB wireless data card through the bus. And then the WiMAX USB wireless data card makes corresponding operations according to the content of the message.

In the realization process of the present embodiment, the CM 508 realizes the functions of network searching, network access, network disconnection, network authentication and so on through invoking the encapsulated API 510, can also realize the specific functions of frequency range configuration, connection mode selection (automatic or manual), setting of search net step length, setting of authentication options, and setting of handover options and so on; the DM 509 realizes the Open Mobile Alliance (OMA) DM1.2 function, Firmware Update Management Object (FUMO) 1.0 function, and device parameters (e.g. bootstrapping, automation configuration and so on) configuration and acquisition through invoking the encapsulated API 510.

Through setting the GSM/WiFi dual mode mobile phone on the software, the embodiment provides software conditions for the realization of the voice and data intercommunication between the GSM/WiFi dual mode mobile phone and the WiMAX base station, and further lays a foundation for realizing the wideband data service, voice call service, IMS VoIP service and so on between the GSM/WiFi dual mode mobile phone and the WiMAX base station.

What needs to be explained is that in the above-mentioned embodiments, the hardware, software, firmware, middleware, microcode, hardware description language or the combinations thereof can be used to realize the embodiments. When the hardware, software, firmware, middleware or microcode are used to realize the embodiment, the program code or code segments for executing necessary tasks can be stored in the machine readable media of the storage media. (A plurality of) processors can execute necessary tasks. The code segments can express any combination of process, function, subprogram, program, routine program, subroutine program, module, object, software package, cluster, or instruction, data structure, or program language. The code segment is coupled into another code segment or a hardware circuit through transmitting and/or receiving information, data, independent variable, or the memory contents. The information, independent variables, parameters, data and so on can be transferred, transmitted or sent in any suitable mode such as memorizer sharing, message passing, token passing, network transmission and so on.

System Embodiment

Figure 6:
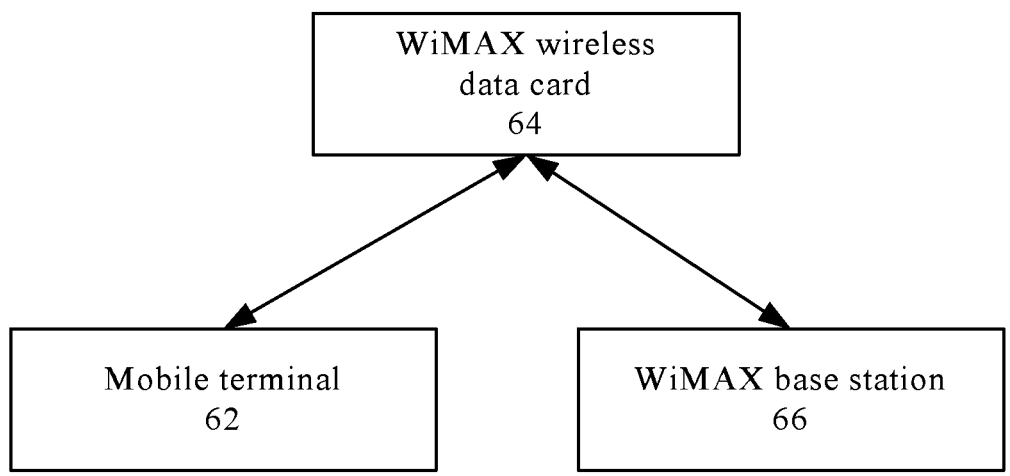
FIG. 6 is a structure diagram of the intercommunication system according to the embodiment of the present invention.

An intercommunication system is provided according to the embodiment of the present invention. The intercommunication system is configured to realize the intercommunication between the mobile terminal and the WiMAX base station. FIG. 6 is a structure diagram of the intercommunication system according to the embodiment of the present invention. As shown in FIG. 6, the system comprises the above mobile terminal 62 (preferably, the mobile terminal 62 can be the GSM/WiFi dual mode mobile phone based on the above-mentioned structure), and further comprises the WiMAX wireless data card 64 connected with the mobile terminal 62 through the interface module of the mobile terminal, and the WiMAX base station 66.

Concretely, the WiMAX base station 66, connected with the WiMAX wireless data card 64, is configured to realize the intercommunication with the mobile terminal through the WiMAX wireless data card. Preferably, the mobile terminal 62 can be connected with the WiMAX wireless data card 64 through an interface; configuration information of the WiMAX wireless data card 64 is obtained, and the logic connection between the mobile terminal 62 and the WiMAX wireless data card 64 is fulfilled according to the configuration information; and the WiMAX wireless data card 64 is used to fulfill the intercommunication with the WiMAX base station 66, i.e., the mobile terminal 62 registers with the WiMAX base station 66 through the WiMAX wireless data card 64; and then the mobile terminal 62 enters the mode of intercommunication with the WiMAX base station 66.

In virtue of the present embodiment, on the basis of minor improvement to the software and/or hardware of existing GSM/WiFi dual mode mobile phone, it realizes the intercommunication between the GSM/WiFi dual mode mobile phone terminal and the WiMAX base station through the WiMAX USB wireless data card, improves the compatibility of the mobile phone, and enables the user experience the wideband data service brought by WiMAX technology.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the step of the present invention can be realized by using the executable program code of the calculating device. Consequently, the modules and the steps can be stored in the storage device and executed by the calculating device, or the modules and the steps are made into integrated circuit module respectively, or a plurality of modules or steps thereof are made into one integrated circuit module. In this way, the present invention is not restricted to any particular hardware and software combination.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the scope of protection of the present invention.

The invention claimed is:

1. A method for intercommunication between a mobile terminal and a World Interoperability for Microwave Access (WiMAX) base station, with the mobile terminal being a dual mode terminal which supports two network systems, comprising:

connecting the mobile terminal with a WiMAX wireless data card via an interface;

obtaining configuration information of the WiMAX wireless data card, and fulfilling the logic connection between the mobile terminal and the WiMAX wireless data card according to the configuration information; and using the WiMAX wireless data card to fulfill the intercommunication with the WiMAX base station, wherein using the WiMAX wireless data card to fulfill the intercommunication with the WiMAX base station comprises:

the mobile terminal registering with the WiMAX base station through the WiMAX wireless data card, which comprises:

the mobile terminal realizing at least one of the following operations through an encapsulated application program interface: network searching, network access, and network authentication; and the mobile terminal sending to the WiMAX base station an access request for registration; and the mobile terminal entering the mode of intercommunication with the WiMAX base station.

2. The method according to claim 1, wherein the interface is a universal serial bus interface, and the WiMAX wireless data card is a WiMAX universal serial bus wireless data card.

3. An intercommunication system, configured to realize the intercommunication between a mobile terminal and a World Interoperability for Microwave Access (WiMAX) base station, comprising:

the mobile terminal comprising:

an interface module, configured to connect a WiMAX wireless data card with the mobile terminal;

a connection managing module, configured to select the mobile terminal to be connected with the WiMAX base station; and a device managing module, configured to obtain and/or configure configuration information of the WiMAX wireless data card, and intercommunicate with the WiMAX base station through the WiMAX wireless data card;

wherein the mobile terminal is operative to register with the WiMAX base station through the WiMAX wireless data card, during which:

the mobile terminal is operative to realize at least one of the following operations through an encapsulated application program interface: network searching, network access, and network authentication; and the mobile terminal is operative to send to the WiMAX base station an access request for registration; and wherein, the WiMAX wireless data card is connected with the mobile terminal through the interface module of the mobile terminal; and wherein the WiMAX base station is configured to realize the intercommunication with the mobile terminal through the WiMAX wireless data card.

4. The intercommunication system according to claim 3, wherein the mobile terminal further comprises:

a power supply module, configured to supply power for the WiMAX wireless data card.

5. The intercommunication system according to claim 3, wherein the interface module is a universal serial bus interface, and the WiMAX wireless data card is a WiMAX universal serial bus wireless data card.

6. The intercommunication system according to claim 3, wherein the connection managing module is configured to execute at least one of the following operations through invoking the encapsulated application program interface: network searching, network access, network disconnection, network authentication, frequency range configuration, connection mode selection, setting of search net step length, setting of authentication options, and setting of handover options.

7. The intercommunication system according to claim 3, wherein the device managing module is configured to realize at least one of the following operations through invoking the encapsulated application program interface: mobile alliance opening, firmware updating management, and configuration and acquisition of device parameters.

* * * * *